July 16, 1940.  L. D. MOWREY  2,208,468
ROD LINE CARRIER
Filed July 15, 1938
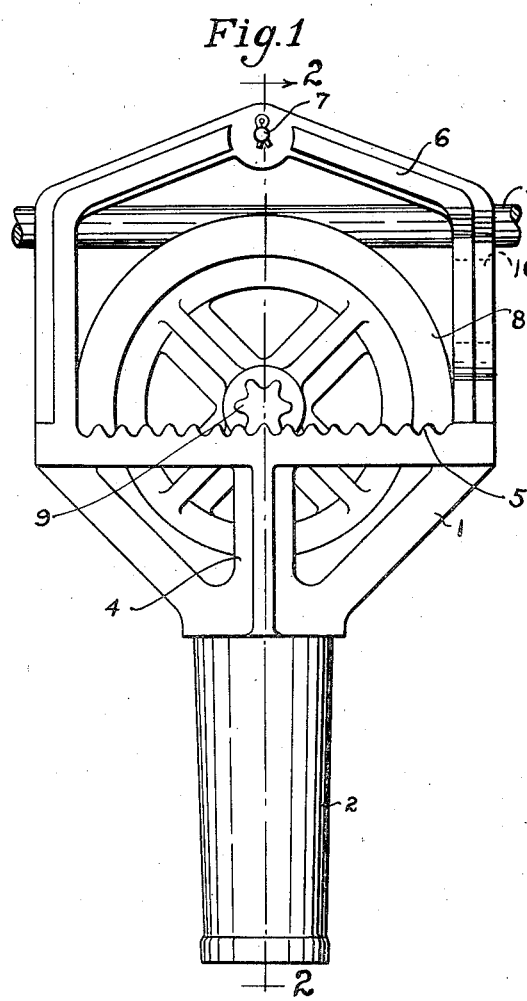
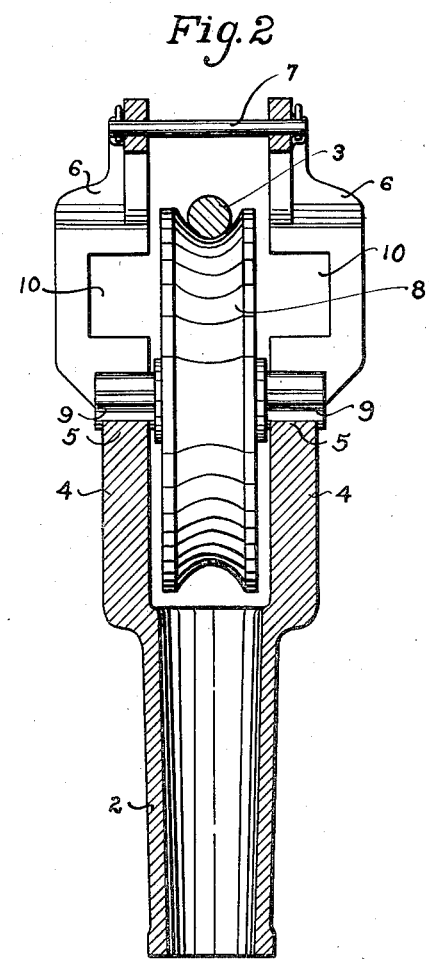
Lester D. Mowrey
INVENTOR.
BY
his ATTORNEY.

Patented July 16, 1940

2,208,468

UNITED STATES PATENT OFFICE 2,208,468

ROD LINE CARRIER

Lester D. Mowrey, Wichita Falls, Tex.

Application July 15, 1938, Serial No. 219,473

7 Claims. (Cl. 308—7)

This invention relates to an improvement in rod line carriers, and more particularly to a carrier for supporting a rod line intermediate an oil well pump and the power mechanism for operating said pump.

It is common practice in oil fields where several wells are located adjacent to each other, in install a central power unit with rod lines extending therefrom to the different wells. These rod lines are usually reciprocated to operate the pumps. In order to reduce the friction on these rods, they are frequently supported on carriers provided with wheels which engage and support the rods, but such wheels are not mounted frictionless and while attempts have been made to eliminate friction by the use of rolling supports for the wheels, the latter are ineffective and cause the wheel journals to cut into the trackway and form pits therein which prevent the rolling action of the wheels.

The object of this invention is to provide for a positive rolling action of the wheel of the rod line carrier to render it frictionless, to eliminate bearings, to provide uniform wear on the support, and to eliminate the necessity for greasing or oiling the journals of a carriers wheel since no friction bearing is provided therefor.

This object is accomplished by mounting the carrier wheel on a trackway in the support whereby the wheel is caused to roll along the track-way in response to the reciprocatory movement of the rod line, so that the wear on the carrier support will be distributed uniformly along the length thereof instead of confining the movement of the carrier journal to a limited portion of the track-way, and friction is substantially eliminated by the absence of a journal in the carrier support which makes greasing and oiling unnecessary.

In the accompanying drawing:

Fig. 1 is a side elevation of the rod line carrier embodying this invention; and Fig. 2 is a vertical sectional view therethrough on the line 2—2 of Fig. 1 showing a wheel in elevation.

I have illustrated a carrier comprising a housing 1 which is generally of skeleton shape with a depending, tapering end 2 on the lower side thereof adapted to fit into a tubular standard or post which is upstanding in the ground to mount the rod line carrier at the proper height for the support of the rod line. A portion of the rod line is designated generally by the numeral 3.

The carrier support has opposite sides 4 spaced apart and each of which is provided with a track 5 thereon coacting to form a track-way in the support, and frames 6 integral with the sides 4, and spaced apart a sufficient distance to receive the guide wheel therebetween. Pin 7 extends between the upper portions of the frames 6 to prevent the wheel and rod line from becoming accidently displaced from their positions in the carrier.

The wheel is designated generally by the numeral 8 and has journals 9 extending from opposite sides thereof, such as may be provided by a pin projecting through the hub of the wheel with opposite ends thereof exposed. The journals 9 have grooves or ribs at the peripheries thereof that interfit with similar grooves or ribs formed in the track 5 as shown in Fig. 1. These interfitting grooves or ribs are so shaped as to provide uniform bearing contact approximately throughout the depth thereof, for even distribution of the weight and stresses of the wheel. At the same time they cause the wheel 8 to roll along the track-way 5 upon reciprocating movement of the rod line 3 to operate a pump, which distributes the wear uniformly along the track-way through the major portion of the length thereof, reduces friction to a minimum, and making it unnecessary to lubricate a bearing for the wheel since no bearing is provided.

The interfitting connection between the track 5 and the journals 9 providing this rolling support for the wheel 8, may be obtained by an suitable coaction therebetween, such as interfiting teeth, ribs, grooves, etc. If this were merely a friction contact it would be insufficient to cause positive travel of the wheel on the track for each reciprocating movement of the rod line because in some instances the rod line may slip over the wheel without travel thereof on the track, and a return movement of the rod line may cause the wheel to be confined in its movement to one end portion of the carrier support which may cause it merely to turn relative thereto, whereby undue wear would be caused on the carrier support to be worn through or at least to form pits in the track-way. This is completely obviated by the interfitting relation between the track-way and the wheel journals in this invention, and wear is uniformly distributed over the length of the track-way with a minimum of friction. At the same time, if the rod line should break or become disconnected, it can slip readily on the wheel, without the necessity for realignment or positioning of the roller when the line is connected again.

The wheels, wheel journals and tracks may be made in sizes to correspond with the desired rod line stroke.

The frames 6 form stops for the wheel journals 9 at opposite ends of the tracks 5 to keep the wheel from running off an end of the trackway.

The frames 6 have slots 10 in opposite sides thereof at one end of the rod line carrier to permit the journals 9 on the wheel 9 to be introduced into the carrier. As shown in Fig. 2, these slots are spaced above the tracks 5, so that the frames will form stops at opposite ends of the tracks, but the slots permit the introduction and removal of the wheel from the carrier upon its being lifted from the tracks.

I claim:

1. A rod line carrier comprising a support having a track-way member, a rod line supporting member having rolling contact with said track-way member, and teeth carried by one of said members and interfitting with the other member for causing positive movement of the supporting member along the track-way upon rotation of said member.

2. A rod line carrier comprising a support having laterally spaced tracks carried thereby, a rotary carrier having journals mounted on said tracks and having a peripheral portion in position to receive a rod line thereon, and teeth forming an interfitting connection between the journals and the tracks for causing bodily movement of the rotary carrier lengthwise of the tracks upon turning movement of said rotary carrier by the rod line.

3. A rod line carrier comprising a support having side frames spaced apart and provided with a depending pin, each of said frames having an elongated track with said tracks extending approximately parallel, a wheel between the tracks and having journals mounted on the tracks for supporting the wheel in position to receive a rod line between the side frames, and interfitting ribs between the peripheries of the journals and the upper portions of the tracks forming interfitting connection therebetween to cause bodily lengthwise movement of the wheel along the tracks upon rotary movement of said wheel by the rod line.

4. A rod line carrier comprising a support having a stationary trackway, a rotary carrier having a peripheral portion in position to receive a rod line, said carrier having toothed journals mounted on the trackway and interfitting therewith for causing bodily movement of the carrier along the trackway upon rotary movement thereof.

5. A rod line carrier comprising a frame structure having a pair of spaced tracks, means for mounting said tracks in a stationary position, said tracks having rack teeth on the upper sides thereof, and a rotary carrier having gear-toothed journals mounted on the racks and interfitting therewith for causing bodily movement of the carrier along the trackway upon rotary movement thereof.

6. A rod line carrier comprising a support having spaced tracks carried thereby, at least one of said tracks being provided with rack teeth thereon, and a rotary carrier having journals mounted on the tracks and adapted to receive a rod line thereon, at least one of said journals having peripheral teeth thereon interfitting with the rack teeth for causing bodily movement of the rotary carrier lengthwise of the tracks upon turning movement thereof by the rod line.

7. A rod line carrier comprising a support having spaced tracks provided with rack teeth thereon, and a rotary carrier having journals mounted on the tracks and adapted to receive a rod line thereon, said journals having peripheral pinion teeth thereon intermeshing with the rack teeth for causing positive bodily movement of the rotary carrier lengthwise of the tracks upon turning movement thereof by the rod line.

LESTER D. MOWREY.